(12) United States Patent
Kaczmarek et al.

(10) Patent No.: US 7,441,180 B1
(45) Date of Patent: Oct. 21, 2008

(54) COMPUTER NETWORK FILE SYNCHRONIZATION SYSTEM AND METHOD

(75) Inventors: Stefan Kaczmarek, El Segundo, CA (US); Jay Mairs, Torrance, CA (US); Randy Saaf, Brentwood, CA (US)

(73) Assignee: MediaDefender, Inc., Santa Monica, CA (US)

( * ) Notice: Subject to any disclaimer, the term of this patent is extended or adjusted under 35 U.S.C. 154(b) by 808 days.

(21) Appl. No.: 10/371,513

(22) Filed: Feb. 21, 2003

Related U.S. Application Data (60) Provisional application No. 60/434,282, filed on Dec. 17, 2002.

(51) Int. Cl.
*G06F 17/00* (2006.01)

(52) U.S. Cl. .................. 715/201; 715/200; 715/234; 709/201; 709/202; 709/203

(58) Field of Classification Search ................ 715/500, 715/500.1, 513, 200, 201, 234; 709/201–203
See application file for complete search history.

(56) References Cited

U.S. PATENT DOCUMENTS

| | | | | |
|---|---|---|---|---|
| 5,895,476 | A * | 4/1999 | Orr et al. ................ | 715/517 |
| 6,085,199 | A * | 7/2000 | Rose ..................... | 707/104.1 |
| 6,704,907 | B1 * | 3/2004 | Aoki et al. .............. | 715/530 |
| 6,732,180 | B1 * | 5/2004 | Hale et al. .............. | 709/229 |
| 2001/0018697 | A1 * | 8/2001 | Kunitake et al. ........ | 707/517 |
| 2002/0082999 | A1 | 6/2002 | Lee et al. | |
| 2003/0078888 | A1 | 4/2003 | Lee et al. | |
| 2003/0078889 | A1 | 4/2003 | Lee et al. | |
| 2003/0095660 | A1 | 5/2003 | Lee et al. | |

OTHER PUBLICATIONS

"Music Industry Tries Fear as a Tactic to Stop Online Piracy" by John Healey Los Angeles Times, latimes.com; Apr. 30, 2003; pp. 1-4.
Govt., Tech Critics Decry RIAA Tactics by Bill Holland Billboard.com; Billboard Nov. 3, 2001; 3 pgs.
"Congress cracks down on P2P porn" by Declan McCullagh" CNET News.Com; Mar. 12, 2003; pp. 1-3.
"Software Bullet Is Sought to Kill Musical Piracy" by Andrew Ross Sorkin The New York Times, NYTimes.com; May 8, 2003; pp. 1-2 & pp. 1-2.
Written Testimony for the Oversight Hearing on: "Piracy of Intellectual Property on Peer-to-Peer Networks" by Randy Saaf Sep. 26, 2002; pp. 1-5.
On the Download "There's No There There" by Eric Hellweg Spin Magazine; Jul. 2001; pp. 1-2.
"MediaDefender Says Music Industry Can Beat Napster at Its Own Game" by Almar Latour The Wall Street Journal , Europe View; WSJ.com-Networking News; Nov. 13, 2000; pp. 1-3.

\* cited by examiner

*Primary Examiner*—Stephen Hong
*Assistant Examiner*—David Faber
(74) *Attorney, Agent, or Firm*—Liu & Liu (57) ABSTRACT

A system and method for distribution, replication, and management of files and their metadata across a network of file sharing servers for both preventative and promotion purposes relating to the particular content of the files. The system and method employ a process for dynamically distributing and replicating files across multiple file sharing computer servers using one or more synchronizing computer servers. Once distributed and replicated on a plurality of the file sharing servers, individual, or groups of replicated files are processed using a file modification application, a file input template containing metadata for each replicated file, and preset file destination template information present on each file sharing server. By using different destination template information on each file sharing server in the network, various protective and promotional aspects related to the files may be realized when used in a P2P or similar file sharing network environment.

41 Claims, 4 Drawing Sheets

COMPUTER NETWORK FILE SYNCHRONIZATION SYSTEM AND METHOD

This application makes a claim of priority from U.S. Provisional Application No. 60/434,282, entitled "The Syncher", filed Dec. 17, 2002 in the name of Saaf et. Al, which is assigned to Media Defender Inc., the assignee of the present invention, which application is fully incorporated by reference herein.

BACKGROUND OF THE INVENTION

1. Field of the Invention

This invention relates generally to a system and method for distributing, replicating and managing files across multiple computer systems. More particularly this invention relates to the synchronization of a system of media files and associated metadata across a network of file sharing servers for generating a large volume and variety of unique files to share over Peer-to-Peer or similar networks to accomplish various preventative and/or promotional applications related to the content of the media files.

2. Description of Related Art

Online access to digital media (including audio, images, video, text based files, computer programs, and other software content) has become commonplace in recent years, not only through legitimate online purchasing and downloading methods, but also largely through the proliferated use of Internet based file sharing/swapping and or trading communities, collectively known and referred to as "Peer to Peer" (P2P) applications or networks. While perhaps not inherently illegal, these P2P networks are most often used by digital media consumers to engage in mass sharing and downloading of copyrighted files across the Internet. As a result, many companies which develop such digital content have reported lost sales, and such P2P trading continues to pose a threat to the bottom line of content providers. The music industry in particular has quoted dwindling sales of CD's in the past several years, which according to their data, is due in large part to such illegitimate online file trading. Several methods to thwart illegal online trading have been adopted and proposed, none of which has yet proven to be a viable answer to the growing P2P piracy problem.

For instance, many forms of encryption and digital rights management have been implemented in audio content files themselves to thwart or deter online piracy. Even given the best file encryption methods however (which are often broken by determined media pirates), once a song or audio file has been recorded onto a computer via any means (ie. cracking the file encryption, or simply recording hi-fidelity audio into a computer via commercially available hardware and software packages) the file(s) may be easily shared on the Internet via any number of currently available P2P networks.

Concerning the P2P networks themselves, many have or could potentially be shut down via legal avenues, however due to the intense popularity of such applications, and the easy access to source code for P2P applications, more decentralized and unregulated P2P networks continue to crop up and to be used largely for illegitimate downloading purposes, thus creating a problem which may not feasibly be solved solely through application of the legal system. Even broad legislation addressing such piracy problems would suffer from the same inabilities to effectively and judiciously reign in every user and proliferator of P2P applications. Thus, the decentralization and proliferation of online file sharing networks has created an environment ripe for both piracy, and promotion of digital content.

In recent years, content industries have taken on somewhat of a "fight fire with fire" approach, and begun attempting to seed some P2P networks with lower quality (often for advertisement purposes), or decoy media files (containing bogus media content). While sometimes effective against causal P2P users, more sophisticated P2P users are able to thwart such methods by identifying bogus content (using data hash values or other data identifying characteristics) and weeding such content out of downloads. Additionally, because content can be better protected (and conversely, promoted) when a file is distributed across multiple servers under a multitude of different names, the task of generating, distributing, replicating, renaming, and managing a voluminous quantity of decoy (or promotional) files is prohibitively burdensome using currently available systems and methods.

For instance, currently, if a content owner desires to protect content online using a decoy distribution method, he must manually replicate, rename (including modification of the file metadata, and optionally manipulation of the file data to change data hash values), and distribute the decoy files to one or more file sharing servers, and then manually update and manage such files on each server. Even given these tasks, the protection gained using this method is only as good as the number of unique files (having different names, metadata, and data hash values) the content owner is willing to generate for a given item of media content, as many instances of the same file on a P2P network can easily be identified and avoided by P2P users. Thus, given a large quantity of desired content files to be protected, the content owner must manually generate and distribute thousands, or even millions of unique decoy files to provide adequate protection against piracy. Similarly, content owners desiring to promote the proliferation of their content using P2P networks experience similar difficulties in generating a large quantity of unique files to distribute which would enable the quick and effective distribution, and thus promotion, of their content.

As such, currently existing technologies and methods have not adequately addressed the problems involved in distributing, replicating, and managing digital files for use in preventative and promotional applications in P2P or similar file sharing networks, thus minimizing or maximizing, respectively, the proliferation of given media content (such as music files) on the network(s). There is therefore a need for a computer network file synchronization system and method for distributing, replicating, and managing many generated decoy or promotional files across multiple networked computer systems to enable improved preventative and promotional applications in online file sharing networks, which overcomes the shortcomings in the prior art.

SUMMARY OF THE INVENTION

The computer network file synchronization system and method of the current invention overcomes the restrictions and limitations of the prior art, and enables a new level of both file protection and promotion in file sharing networks (including P2P networks, centralized file servers, internet bulletin board systems, etc). In short, this invention enables the distribution, replication, and management of a system of files and file sharing servers, which effectively diminish the amount of piracy (and conversely increase the potential for promotion) of desired media content. While there are an innumerable amount of factors affecting the likelihood that particular media content will or will not be successfully pirated via file sharing networks, the present invention is targeted at significantly lessening the ease with which copyrighted content files are currently downloaded, and creating an environment where piracy becomes overly burdensome to the file sharing network user. Correspondingly, the present invention also enables significant promotional aspects for desired digital content by drastically increasing the likelihood that a given file will be download by file sharing network users.

A content synchronization and mass distribution mechanism ("content proliferation mechanism") is disclosed by the present invention.

In one aspect of the content proliferation mechanism of the present invention a computer network file synchronization system ("file synchronization system") for accepting previously generated input content files ("input files"), distributing, replicating and managing the input files for use on file sharing networks, including; one or more synchronizing servers, one or more file sharing servers connected to the synchronizing server(s), an input file and associated input file template on the synchronizing server(s), a unique destination template on each file sharing server, and a content file modification and/or processing means on each file sharing server for modifying distributed content files according to the input file template and unique destination file template.

In another aspect of the file synchronization system of the current invention, the input file contains a data identification portion, and a data content portion. The data identification portion may include the file name, and any metadata that may be appended or embedded to the data content portion of the file, including a data hash value. The data content portion is the actual data representing the content of the file, whether it be audio, video, program, application, or even empty (blank) data according to the current invention. The file modification means includes the ability to modify input files such that the resultant output file contains a unique data identification portion (filename and metadata, and optionally a unique identifying value, such as a data hash value). In one embodiment of the file modification means of the present invention, the modification of the data identifying value is performed to match a target value, such as the discovered data hash value of an infringing content file discovered on a file sharing network. Such manipulation of the data identifying values of files generated by the current invention can function to thwart piracy on file sharing networks by interfering with the integrity of files downloaded via swarm or multisource downloading methods.

In one embodiment of the file synchronization system of the current invention, the synchronization server and file sharing serves are standard computer servers networked via common Local Area Networking (LAN) or Wide Area Networking (WAN) protocols rather than P2P or similar file sharing protocols.

In another embodiment of the file synchronization system of the current invention, multiple destination templates are placed on, or made accessible to, each file sharing server such that a random destination template may be selected by the file modification means from a set of available destination templates during generation of each output file. It is also contemplated that the generation of multiple unique output files from the same input file may be accomplished by a single computer using such random selection of destination templates in conjunction with the file modification means.

In yet another embodiment of the file synchronization system of the current invention, blank input files are placed on, or made available to each file sharing server, such that no input file is needed for each desired set of unique output files, rather, an input template for each set of output files is provided, which, in conjunction with the blank input file(s) and destination template provide the necessary unique output files according to the current invention.

In an alternate embodiment of the file synchronization system, the synchronization server and file sharing servers use a P2P or similar file sharing protocol to accomplish file synchronization and management functions, effectively allowing an unlimited number of computer systems to be used as file sharing servers to accomplish the present invention.

In another embodiment of the file synchronization system of the current invention, the input file, input file template, and destination templates all relate to copyrighted content files (such as MPEG Layer 3 (MP3) audio files). For instance, in the case of copyrighted audio content files, the input file may be a previously generated MP3 file containing either decoy or promotional content for use on file sharing networks, the input file template contains metadata related to the MP3 file (such as artist, album, track number, track title, and track length data), and the destination template consists of an MP3 filename formatting scheme and additional metadata, such as a file description. The file modification means may be an MP3 file maker ("MP3 Maker") application is which is capable of accepting an input audio file, converting (if necessary) the audio file to MP3 format for sharing on file sharing networks, appending metadata to the audio file, and modifying the data identifying value of the file (such as the data hash value).

In yet another embodiment of the file synchronization system, a local maps file is included on each file sharing server for storing and accessing information relating to all present input files and generated output files, such as input and output file names and file locations. The local maps file is used during subsequent file management operations such as the addition or removal of files from file sharing servers.

In a further embodiment of the file synchronization system, a user interface is provided for enabling simple operation of the network synchronization system, as well as a monitoring and reporting means for tracking and providing results and statistics regarding the sharing of generated files, and the health status of each file sharing server. Such monitoring and reporting means may be used to assess the effectiveness of various shared files for their intended purpose, and make appropriate modifications in the system as a result.

In another aspect of the content proliferation mechanism, a file synchronization method for distributing and replicating a system of media files across a network of file sharing servers ("file synchronization method") is provided, including the steps of, designating a synchronizing server for the network of file sharing servers, providing a first input file and associated input file template to the synchronizing server, synchronizing the input file and input file template to all file sharing servers in the network of file sharing servers, providing unique destination templates on each present file sharing server in the network of file sharing servers, and modifying the synchronized input file on each file sharing server using the input file template, destination template, and a file processing application to generate a unique output file on each file sharing server in the network of file sharing servers.

In one embodiment of the file synchronization method of the current invention, the generated output file(s) are shared via well known file sharing methods on common file sharing networks (such as P2P networks) to enable various preventative and promotional applications related to the particular media content of the input files.

In another embodiment of the file synchronization method of the current invention, a method of managing the files on each file sharing server is presented wherein each file sharing server in the network of file sharing servers monitors the synchronization server for added or deleted media files and updates their respective file contents accordingly. In one aspect of the file management method, each file sharing server includes a local maps file on which information relating to all present input files and associated output files is located. In the case that a given input file is deleted from the synchronization server, each file sharing server monitoring the synchronization server correspondingly removes the given input file and all associated unique output files generated by the file sharing server using the local maps file. Using such a file management and synchronization scheme, massive amounts of input files, for both preventative and promotional purposes, may effectively and efficiently managed by inserting or removing particular input files from the synchronization server. In a further embodiment of the method of managing files in the current invention, the input files are removed from each file sharing server following the completion of all file generation operations relating to that particular input file such that disc space is routinely freed on each file sharing server.

BRIEF DESCRIPTION OF THE DRAWINGS

For a fuller understanding of the nature and advantages of the present invention, as well as the preferred mode of use, reference should be made to the following detailed description read in conjunction with the accompanying drawings. In the following drawings, like reference numerals designate like or similar parts throughout the drawings.

DETAILED DESCRIPTION OF THE PREFERRED EMBODIMENT

The present description is of the best presently contemplated mode of carrying out the invention. This description is made for the purpose of illustrating the general principles of the invention and should not be taken in a limiting sense. The scope of the invention is best determined by reference to the appended claims.

All publications referenced herein are fully incorporated by reference as if fully set forth herein.

The present invention can find utility in a variety of implementations without departing from the scope and spirit of the invention, as will be apparent from an understanding of the principles that underlie the invention. It is understood that the content proliferation mechanism of the present invention may be used as a promotional tool and preventive measure (relating to copyright infringement) in file sharing networks. It is also understood that while the present invention is best explained in reference to a particular set of files (generally multimedia audio files, and specifically MP3 files) which are distributed, replicated, and managed using the current system and process, the number of particular media and general file types able to be used in conjunction with the present system and method is virtually limitless (i.e. audio data, image data, video data, text data, software application data, and blank data). In general for a given file type, one or more files may be distributed to, replicated on, processed, and managed on a system of file sharing servers for a variety of purposes using the file synchronization system and method of this present invention.

System Overview

The present invention is directed to the proliferation of content through distribution, replication, and management of a large variety of files to share on a massive scale on file sharing networks. Each replicated file from an input or blank file appears uniquely different to file sharing network users (and associated P2P or other client software) so that they do not get swarmed together with multi-source downloading mechanisms. The only property of the files which remains constant across all servers is the file's data content integrity (the data content portion). While the data identification portion of the files (i.e. filenames, metadata, and optionally data hash values), and file sizes differ, the data content integrity of the files is preserved. Thus in a system of "n" file sharing servers, the present invention can be used to create at least "n" uniquely identifiable copies of each original media file. In most cases there are multiple unique files created for each input file. In so doing, the multitude of unique files having the same data content creates confusion on the Internet because users think they are downloading different content, when in fact the content is exactly the same, under disguise.

The system and method of the present invention is not limited to handling only one input file type at a time. In general, multiple input file types (such as audio files, video files, executable application based files, and even blank content files), associated input file templates, and corresponding destination templates may be used simultaneously in conjunction with the system and method of the present invention to generate unique output files for each input file.

Synchronization System

Figure 1:
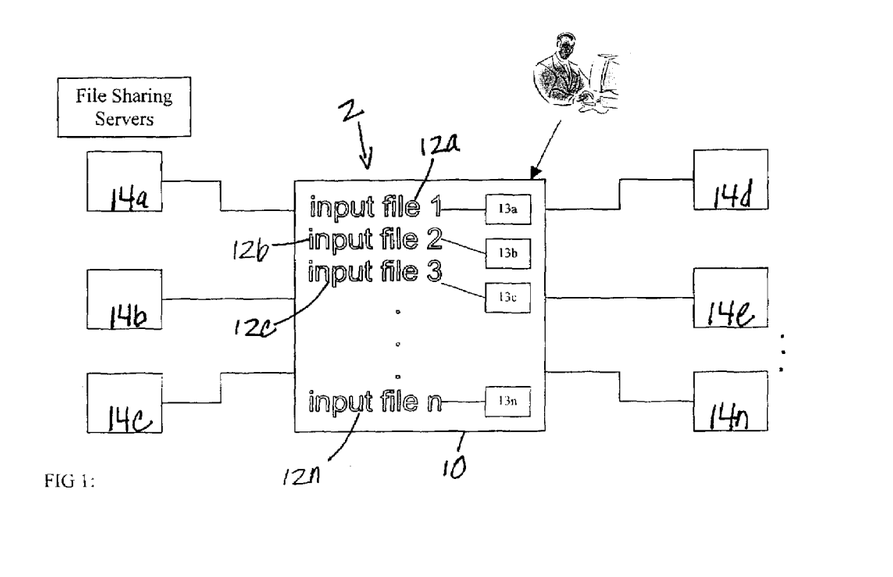
FIG. 1 is a schematic block diagram showing the file sharing network according to the current invention.

Looking now to FIG. 1, the file sharing network 2 is shown schematically, and includes file synchronizing server 10 and file sharing servers 14a-14n. According to one embodiment of the present invention, synchronizing server 10 and file sharing servers 14a-14n are standard computer servers, such as Microsoft Windows™ based servers connected by the common ethernet LAN protocol 16. Input files 12a-12n are placed on the file system of the synchronizing server by a system operator via any available means (File Transfer Protocol (FTP), CDROM, etc.) in any desired order, and at any time. In one example system, input files 12a-12n are MP3 audio files which have been previously generated via known methods to be decoy or promotional files for use in a file sharing network. It is desirable, though not necessary, to use the fastest possible networking technology (such as gigabit ethernet) between synchronizing server 10 and file sharing servers 14a-14n so minimal file transfer times are achieved. Wide Area Network (WAN) technologies as well as file sharing networks themselves may also be used to enable the file transfers and synchronization aspects of the current invention. It will be understood and appreciated by those skilled in the art that any number of file synchronizing servers 10 and file sharing servers 14a-14n may be used and configured according to the present invention to enable file synchronization across all file sharing servers of desired input files 12a-12n.

Figure 2:
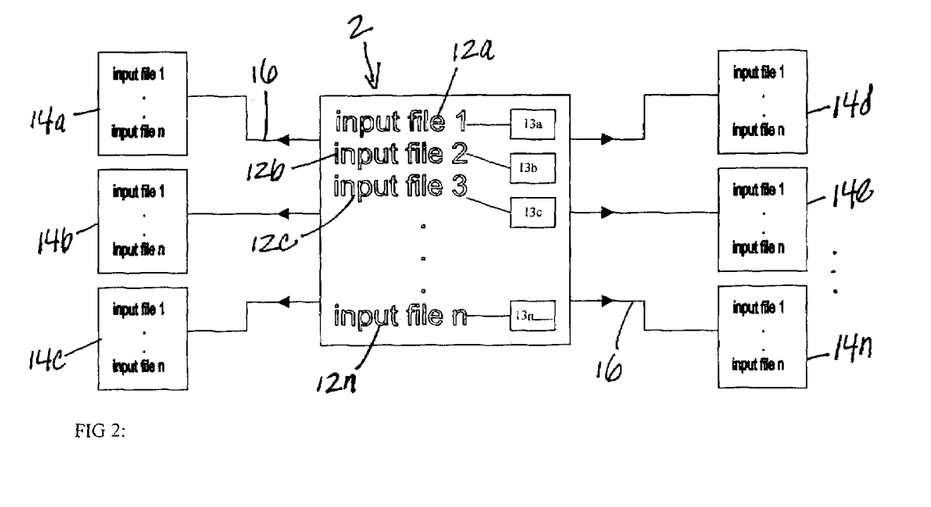
FIG. 2 is a schematic block diagram showing the file sharing network and synchronization scheme of the current invention.

Once on synchronizing server 10, the input files 12a-12n may be downloaded (synchronized) with each file sharing server 14a-14n as shown in FIG. 2. Generally, each file sharing server is configured to monitor the file system of synchronizing server 10 such that new input files are downloaded to the file sharing server once they become present on the synchronizing server file system. This monitoring function may be accomplished via a variety of known network monitoring and file transferring mechanisms, and is well within the routine skill of one skilled in the art of computer networking systems to implement. In FIG. 2, all input files 12a-12n have been successfully synchronized with each file sharing server 14a-14n. In lieu of the synchronization of input files, blank content files may be present on, or made accessible to each file sharing server for further processing to generate unique output files according to the present invention. In general, blank content files are those having an empty or null data set, such that the file occupies a given amount of disk space, but contains no useable/recognizable data content. Blank data files still have a data identification portion and data content portion according to the current invention, such that the meaningless or unusable data content may be assigned a filename, metadata, and optionally data hash values such that it appears to contain valid data content. Blank data files may also be generated on the fly.

Figure 3:
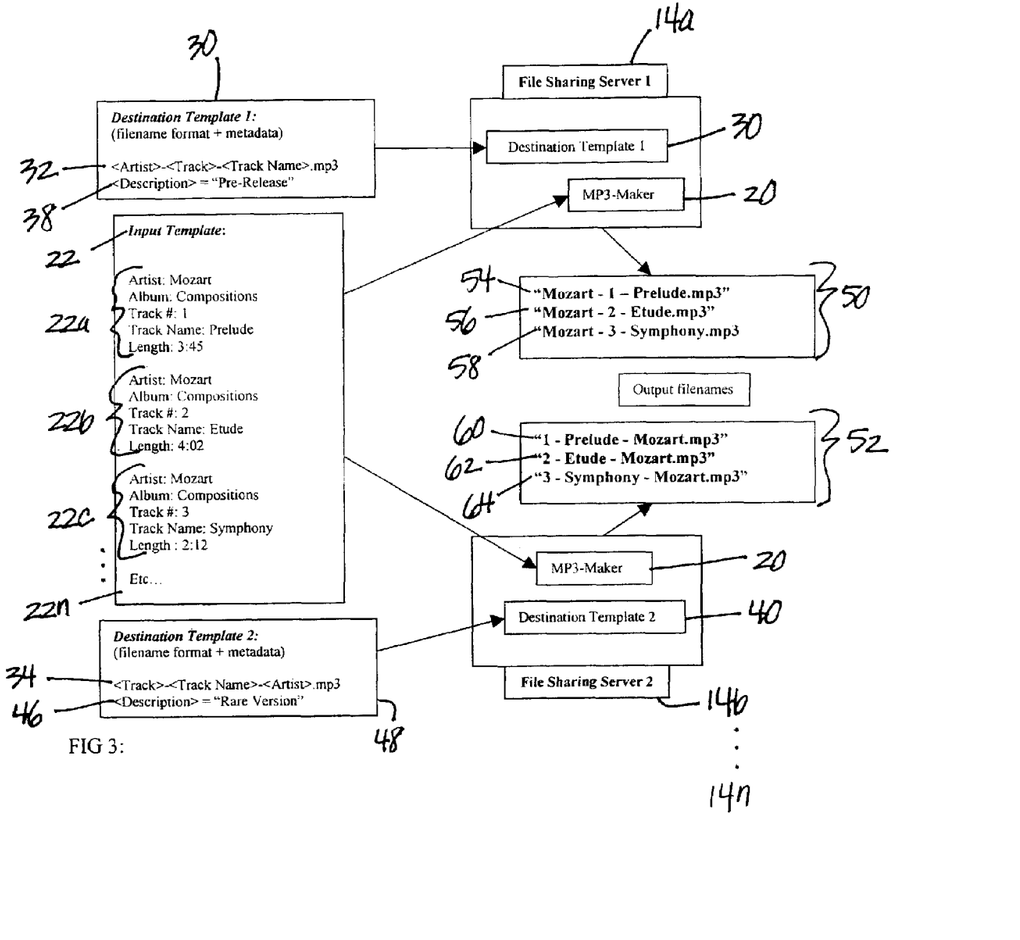
FIG. 3 is a schematic block diagram illustrating the file naming process across various file sharing servers according the present invention.

13a-13n represent the input templates associated with each input file 12a-12n, and may be any data file(s) containing metadata corresponding to each input file. These input templates may be separate from, or appended to each input file, but in either case are transferred to each file sharing server during synchronization such that each file sharing server has a copy of both input files and associated input templates following synchronization. In situations where no input file is used, such as when blank data files are used for each file sharing server to generate the unique output files (as described above), the input template alone may be the sole file transferred to each file sharing server during synchronization. Input templates may be manually generated for corresponding input files (or for desired output files, when no input file is used), however, it is often the case that existing commercially or publicly available data files/services may be used (such as the CDDB database by Gracenote) to dynamically generate or facilitate input template files in the current invention. For instance, any commercially available movie database containing such information as movie title, director, actors, release date, etc may be used in the case of video files to generate input templates relating to input video files. Such use of existing metadata databases may be used to optimize the speed and efficiency of the system. Input templates 13a-13n may be multiple files as depicted, or may be a single file containing metadata for multiple input files. For instance, in one example system, input files 12a-12n represent consecutively ordered (by filename) MP3 files corresponding to tracks for a particular artists album, and the input template is a single file containing associated metadata (such as such as artist name, album name, track number, track title, and track length data). An example of one such input template 22 is depicted in FIG. 3. Section 22a of input template 22 is metadata corresponding to a first input file 12a, section 22b is metadata corresponding to a second input file 12b, section 22c is metadata corresponding to a third input file 12c, up through section 22n which is metadata corresponding to input file 12n.

In another aspect of the current system, each file sharing server is preconfigured to include a destination template (shown at 30 and 40 of FIG. 3 for file sharing servers 14a and 14b respectively), which relates to the particular content type of input files 12a-12n and input templates 13a-13n. The destination template files define how the filenames, file sizes, bit rates and other metadata properties of the files are assigned. The purpose of each destination template is to give each file sharing server a means to generate unique output files from each input file. For example, the destination template 30 relates to MP3 audio files and associated metadata from input template 22. In the examples shown, one destination template is present on each file sharing server of the system, and is used for the generation of each output file. It will be understood and appreciated that multiple destination templates, either present on, or accessible by each file sharing server may be used to facilitate the generation of unique output files. For instance, each file sharing server of the system may be configured to access or use a random destination template from a set of available destination templates in order to cause a greater number and variety of unique output files to be generated by the system. Using such a system, it is possible to generate and share a variety of unique output files from a single input file (or blank file) on a single computer system. Additional aspects of the nature and usage of destination templates is described in greater detail below.

Each file sharing server is loaded with, or has access to, an input file modification software application for altering each synchronized input file present on the file sharing server as to it's filename, metadata, and optionally, data size and uniquely identifiable data (such as the hash value for each file). Concerning the use of blanks data files, it is also within the scope of this present invention to configure the file modification software to generate empty or blank data sets (rather than using an existing blank data file) during the output file generation process. Thus, given such information as a target file size, an input and destination template for the desired output file, and optionally a data hash value, the file modification software of present invention is able to generate output files without the provision of any input file.

In the example system shown in FIG. 3, the input file modification software on each file sharing server is an MP3-Maker application 20 which is able to process MP3 audio files to alter their file name, metadata (ie. ID3 Tag) and data hash value. The file name and metadata modifications are made using information from both input and destination templates on the file sharing server. For instance, the file name and ID3 tag of an input MP3 file may be altered or generated by applying information from the input template associated with the MP3 file to a format designated by the particular destination template on the file sharing server, plus any additional metadata contained in the destination template (such as a file description). Each input file may be further altered such that data identifiers, such as data hash values, associated with the file are unique from other generated files. The data hash value or other unique data identifiers may be modified by altering portions of the data itself, such as the addition, removal, or rearrangement of bytes in the actual file. The MP3 Maker may also be configured to directly modify the data hash values of input files (for instance, to set the hash value to a generated value, or to match the data hash value to that of a particular target value). This modification of hash values further alters any identifiable characteristics of output files having the same content, even to sophisticated monitoring or file analysis programs which use data hash values to determine file content similarity. Additionally, the hash values of particular infringing content found in file sharing networks may be determined and applied to input files in the MP3 Makers of one or more file sharing servers to generate decoy files which appear identical to infringing files being shared in file sharing networks.

Because swarm or multisource downloading is commonly used by P2P applications (such that multiple files from different hosts are relied upon to complete the download of a single file), the generated decoy files having identical characteristics to infringing files (except for the data content) will often become part of swarm download procedures, thus altering the data integrity of the downloaded files and furthering piracy prevention aspects of the current invention.

It will be appreciated that the methods and procedures used to determine hash values will differ depending on the many different ways hash values are computed and assigned to content files. It is also the case that certain hash algorithms (and particularly those using only a small portion of the file data to calculate a hash, such as MD5) may yield hash values which are more easily determined than other more sophisticated hash algorithms. In general, an initial determination of the hash algorithm used for a particular file (sucn as MD2, MD5, SHA-1, etc) in addition to currently known hash searching algorithms may be used to determine the hash value. It is contemplated that future improvements in computing technology and hash search algorithm sophistication will enable more efficient methods of determining data hash values for particular content files. Notwithstanding the foregoing, it is within the scope of the present invention to use determined hash values in order to match the value of discovered content files to decoy content files generated by the system and method of the current invention.

In the example system shown in FIG. 3, a set of input files (not shown) on both file sharing servers 14a and 14b is processed by MP3-Maker 20 (the same application is used on both file sharing servers) using both input template 22 and destination template 30 (for file sharing server 14a) and destination template 48 (for file sharing server 14b). The following description illustrates the ability of the current system to create uniquely identifiable MP3 output files 50 and 52 (each having the same data content) from the same set of input files.

Destination template 30 on file sharing server 14a has filename format 32 comprising the following order:

<Artist>-<Track>-<Track Name>.mp3

Destination template 30 also includes additional description metadata field 38 "Pre-Release."

MP3-Maker 20 on file sharing server 14a generates MP3 output files 50 from the input files (not shown) and corresponding sections (fields 22a-22c) of input template 22 by applying each input template field to the filename format 32 of the destination template 30, for each input file. The output files 50 also contain appended metadata 38 from destination template 30, to further distinguish from output files generated by other filesharing servers, even if such servers have destination templates with the same filename format as destination template 30. For a first input file corresponding to section 22a of input template 22, the output file 54 named "Mozart-1-Prelude.mp3" is yielded by applying destination template 30 to MP3-Maker 20. The second input file corresponding to section 22b of input template 22 yeilds the output file 56 named "Mozart-2-Etude.mp3" by application of destination template 30 to MP3-Maker 20. Likewise, a third input file corresponding to section 22c of input template 22 yields output file 58 named "Mozart-3-Symphony.mp3" by application of destination template 30 to MP3-Maker 20. Additionally, as described above, each file 54, 56, and 58 contains the appended "Description" metadata field named "Pre-Release." It is also possible using the current invention to append common metadata fields (such as artist, album, track, track name, and length), as well as any other desired metadata fields to the contents of output files 50. These metadata fields may serve to enhance the likelihood of file proliferation on file sharing networks by further distinguishing sets of generated output files from separate file sharing servers creating a more diverse file base across all file sharing servers.

Similarly, file sharing server 14b shown in FIG. 3 uses MP3-Maker 20 to generate MP3 output files 52 from the same set of input files (not shown) as file sharing server 14a. According to the current invention however, MP3 output files 52 have a different naming scheme, metadata, and data hash values than MP3 output files 50, and are not identifiable as having the same data content as MP3 output files 50. File sharing server 14b uses both input template 22 and destination template 48. Destination template 48 on file sharing server 14b has filename format 34 comprising the following order:

<Track>-<Track name>-<Artist>.mp3

Destination template 48 also includes additional description metadata field 46 "Rare Version"

MP3-Maker 20 on file sharing server 14b generates MP3 output files 52 from the input files (not shown) and corresponding sections (fields 22a-22c) of input template 22 by applying each input template field to the filename format 34 of the destination template 48, for each input file. The output files 52 also contain appended metadata 46 from destination template 48, to further distinguish from output files generated by other file sharing servers, even if such servers have destination templates with the same filename format as destination template 48. For a first input file corresponding to section 22a of input template 22, the output file 60 named "Prelude-Mozart.mp3" is yielded by applying destination template 48 to MP3-Maker 20. The second input file corresponding to section 22b of input template 22 yeilds the output file 62 named "Etude-Mozart.mp3" by application of destination template 48 to MP3-Maker 20. Likewise, a third input file corresponding to section 22c of input template 22 yields output file 64 named "Symphony-Mozart.mp3" by application of destination template 48 to MP3-Maker 20. Additionally, as described above, each file 60, 62, and 64 contains the appended "Description" metadata field named "Rare Version." It is also possible using the current invention to append common metadata fields (such as artist, album, track, track name, and length), as well as any other desired metadata fields to the contents of output files 52. These metadata fields may serve to enhance the likelihood of file proliferation on file sharing networks by further distinguishing sets of generated output files from separate file sharing servers creating a more diverse file base across all file sharing servers.

In one embodiment of the present invention, a local maps file is included on each file sharing server for storing and accessing information relating to all present input files and associated (generated) output files. The local map files and associated file management method are described in greater detail below.

In a another embodiment of the present invention, a user interface is provided for enabling simple operation of the network synchronization system, as well as a monitoring and reporting means for tracking and providing results and statistics regarding the status of each file sharing server and the sharing of generated output files on file sharing networks. Such monitoring and reporting means may be used to assess the effectiveness of various shared files for their intended purpose, and make appropriate modifications to the system as a result. It may also be used to monitor the health of each file sharing server in the network (such as the network/Internet bandwidth usage, CPU status, RAM status, hard disk space, etc) to ensure the integrity of generated files and the network as a whole. File sharing servers experiencing problems may be restarted remotely using the monitoring means to reset the server. It will be understood and appreciated by those skilled in the art that many user interface modules as well as tracking and status reporting applications are possible for use in conjunction with the synchronization system of the present invention without departing from the spirit and scope of the current invention.

Process Steps

Figure 5:
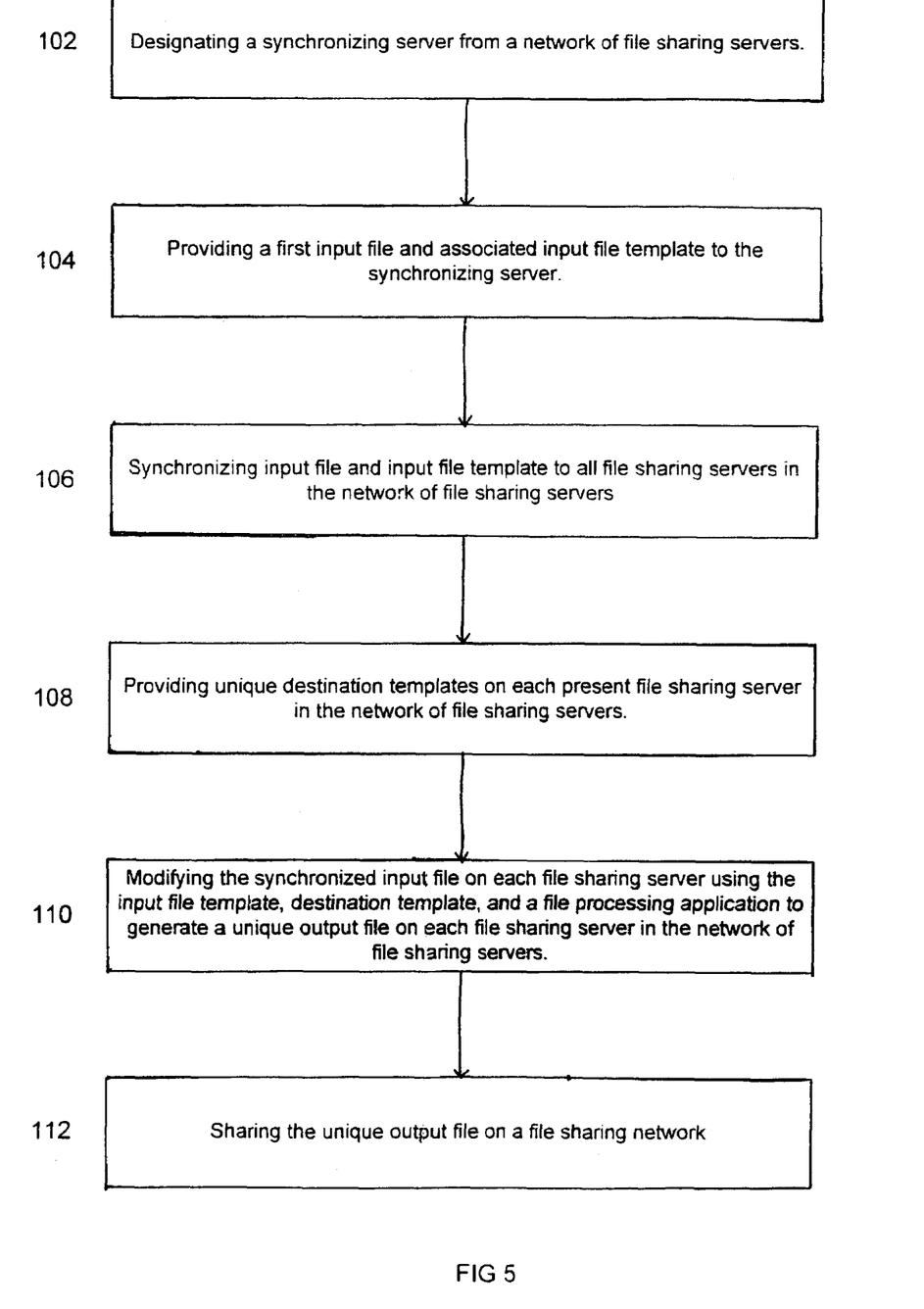
FIG. 5 is a process flow diagram illustrating the file distribution, replication, and management process steps of the current invention.

One aspect of the current invention is the ability to generate multiple output media files using the same input file such that each output file contains unique file name, metadata, and other data identifying values (such as data hash values) using a computer network file synchronization method ("synchronization method"). FIG. 5 illustrates the general process steps of the synchronization method of the current invention. In step 102, a synchronizing server is designated for a network of file sharing servers, such as the synchronizing server 10 and file sharing servers 14a-14n of the above described file synchronization system. The file sharing server is given a unique name and all file sharing servers are configured to recognize and connect to the file sharing server for later file sharing operations. In step 104, a first input file and associated input file template is provided to the synchronizing server. In step 106, the input file and input file template are synchronized to all file sharing servers in the network of file sharing servers. In step 108, unique destination templates are provided on each present file sharing server in the network of file sharing servers for applying unique file naming schemes to each input file. In step 110, the synchronized input file on each file sharing server is modified using the input file template, destination template, and a file processing application to generate a unique output file on each file sharing server in the network of file sharing servers. In one embodiment illustrated by step 112 of FIG. 5, the unique output files generated by the prior process steps are shared on file sharing networks to enable various preventative and promotional applications related to the particular media content of the input files.

In another embodiment of the file synchronization method of the current invention, a method of managing the files on each file sharing server is presented wherein each file sharing server in the network of file sharing servers monitors the synchronization server for added or deleted media files and updates their respective file contents accordingly. In one aspect of the file management method, each file sharing server includes a local maps file in which information relating to all present input files and associated output files is located. The local maps file on each file sharing server can be preconfigured to contain data fields such as the input file name, input template name, input file and template locations (such as the location on the hard drive of the file sharing server where each input file and associated input template is stored), as well as multiple data fields for the file names and file locations for each generated output file. During file synchronization and file processing steps, data is recorded in the local maps file regarding the file names and locations for later management operations such as file cleanup or inventorying. In the case that a given input file is deleted from the synchronization server, each file sharing server monitoring the synchronization server correspondingly removes the given input file, input template, and all associated unique output files generated by the file sharing server using the local maps file. Because the large quantity of output files generated by the current invention may fill available drive space on each, file sharing server, the input file can be deleted directly following generation of associated unique output files on each file sharing server in order to conserver drive space. The local maps file may be any modifiable data file such as a database, spreadsheet, data table, or other data file accessible by the synchronization and file modification software. Using such a file management and synchronization scheme, significant amounts of input files, for both preventative and promotional purposes, may effectively and efficiently managed by inserting or removing particular input files from the synchronization server. The process of synchronizing and managing files using the method of the current invention is persistent according to one embodiment, in that each file sharing server continuously checks the synchronizing server for new input files and templates to download, or for files which have been removed and should be deleted locally (including all generated file using the local map file on each server). It will be understood and appreciated by those skilled in the art that many formats and methods for managing input and output files across all files sharing servers is possible given the current invention such that input and output files may be managed by simply modifying files on the synchronizing server, without departing from the sprit and scope of the present invention. It will also be understood and appreciated that the various aspects and embodiments of the file synchronization system of the current invention presented above may be applied to the current method. For instance, blank content files on or accessible to each file sharing server may be used in lieu of synchronized input files. Likewise, multiple destination templates may be made available to one or more file sharing servers such that randomly selected destination templates may be used during the output file generation process. Additionally, the processes steps described above can easily be applied to a single server implementation of the current invention, such that all file modification, generation, and sharing activities are performed on a single computing device rather than multiple file sharing and/or synchronization server(s).

Example Applications

Figure 4:
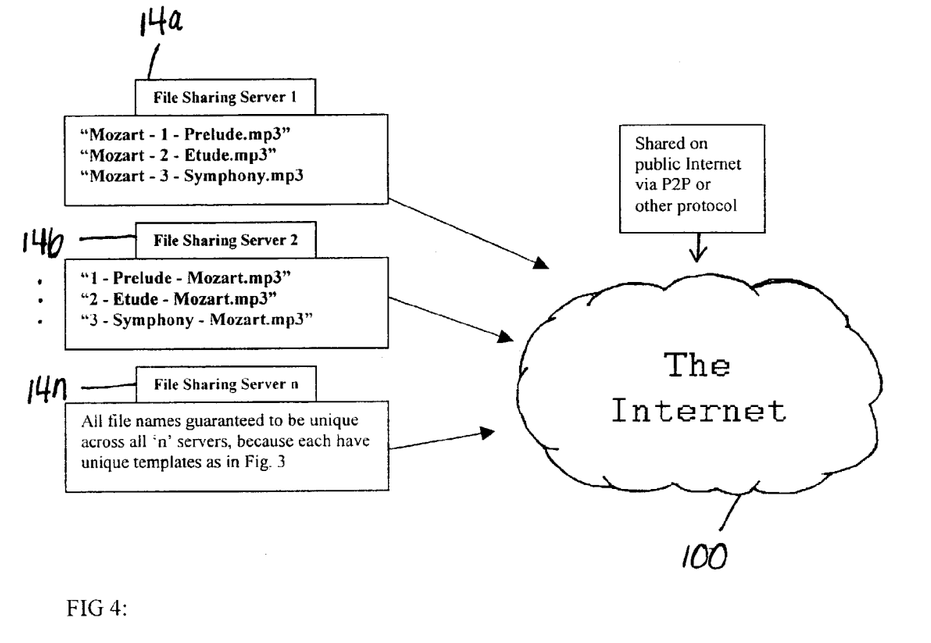
FIG. 4. is a schematic block diagram illustrating the interaction of the file sharing network of the present invention with other public systems on the internet, including P2P systems.

In one example of a preventative application using the system and method of the current invention, decoy input audio files (such as any audio files containing blank, shortened, or low quality versions of a particular artists album tracks) and associated input templates (such as metadata relating to the decoy audio files) may be presented to the synchronizing server of the current invention, synchronized to each file sharing server on the network, processed on each file sharing server using an MP3 Maker application, input template data, unique destination template data loaded on each file sharing server, and data hash value manipulations to yield multiple unique output MP3 files for each input audio file, then shared via common file sharing networks (e.g., public Internet 100 shown in FIG. 4). Because very large numbers of the same decoy file (which will appear to be many different files to file sharing network users) may be generated and shared very quickly compared to current decoy file methods, it will become more difficult for file sharing network users to download fully intact, high quality versions of desired audio files, thereby fostering an environment for that particular file sharing network which discourages piracy and encourages sales of the artists album versus illegitimate downloads. The same method may be replicated for any amount of desired audio content or other media or software content, across any number of file sharing networks to obtain the most desirable piracy prevention results. It is contemplated that using the method of the current invention to quickly generate and share a large quantity of unique decoy files for a particular copyrighted audio file, the ratio of unique decoy files presents online can be significantly greater than "infringing files" for a particular copyrighted audio file thereby promoting downloads of the decoy files and restricting access to the infringing files. This is especially the case when the system and method of the current invention are deployed "pre-release" of the commercially available content.

In order to realize the promotional aspects of the current invention, the exact same system and method as described above may be used, with the exception of decoy file content. In the case of promotional applications, input files containing desired content for promotion on file sharing networks is presented to the synchronizing server in order to generate many unique versions of that same content. Given the same reasons as described in the above preventative application of the current invention, in addition to the distributed file sharing server architecture of the present invention, the content proliferates much faster than is currently possible enabling significant promotional benefits for the content.

The content proliferation mechanism, and associated system and method, of the present invention have been described above in terms of functional modules in block diagram format. It is understood that unless otherwise stated to the contrary herein, one or more functions may be integrated in a single physical device or a software module in a software product, or one or more functions may be implemented in separate physical devices or software modules at a single location or distributed over a network, without departing from the scope and spirit of the present invention.

It is appreciated that detailed discussion of the actual implementation of each module is not necessary for an enabling understanding of the invention. The actual implementation is well within the routine skill of a programmer and system engineer, given the disclosure herein of the system attributes, functionality and inter-relationship of the various functional modules in the system. A person skilled in the art, applying ordinary skill can practice the present invention without undue experimentation.

While the invention has been described with respect to the described embodiments in accordance therewith, it will be apparent to those skilled in the art that various modifications and improvements may be made without departing from the scope and spirit of the invention. Accordingly, it is to be understood that the invention is not to be limited by the specific illustrated embodiments, but only by the scope of the appended claims.

We claim:

1. A system for generating one or more unique output files from an input file, said input file having at least a data identification portion, said system comprising:
    a file template associated with said input file, and containing at least information relating to said data identification portion; and
    a computing hardware device accessing a file processing application to modify said data identification portion of the input file using said file template to generate the one or more unique output files,
    wherein said computing hardware device comprises a first server and a second server, said first server initially receiving said input file and distributing said input file to said second server, and said second server generating the one or more unique output files using the input file and the file template, and
    wherein the first server and the second server are synchronized with respect to the input file and the one or more generated unique output files such that the first server automatically distributes the input file to the second server when it is initially received, and the second server contains a local maps file including the location of the one or more generated unique output files, such that when the input file is removed from the first server, the second server correspondingly removes the one or more generated unique output files.

2. The system as in claim 1, wherein said file template comprises a first file template containing information relating to said data identification portion.

3. The system as in claim 2, wherein said first file template comprises an input template.

4. The system as in claim 3, wherein the input template is created manually.

5. The system as in claim 3, wherein the input template is created dynamically based on information made available by an information source.

6. The system as in claim 5, wherein the information source comprises a database.

7. The system as in claim 5, wherein the input template is embodied in a file.

8. The system as in claim 2, further comprising a second file template containing information related to the arrangement of said data identification portion.

9. The system as in claim 8, wherein said second file template comprises a destination template.

10. The system as in claim 9, wherein the destination template comprises multiple unique destination templates, said destination templates being accessed in a random fashion by said file processing application in order to generate the one or more unique output files.

11. The system as in claim 1, wherein the input file further having a data content portion comprising at least one of audio data, image data, video data, text data, software application data, and blank data.

12. The system as in claim 1, wherein at least one of said unique output files is made available on a file sharing network using the second server.

13. The system as in claim 1, further comprising at least one synchronizing server receiving the input file and distributing the input file to a file sharing server.

14. The system as in claim 13, wherein the synchronizing server and the file sharing server operatively interact to provide updates of the input file and the unique output file on the file sharing server.

15. The system as in claim 14, wherein the file sharing server includes a maps file comprising information relating to the input file and the unique output file, which is wed for providing the updates.

16. The system as in claim 15, wherein said updates comprise at least one of:
    at least one new input file added to said file sharing server; and
    at least one input file and associated unique output file removed on the file sharing server.

17. The system as in claim 13, further comprising:
    reference data stored in the file sharing server, relating to the name of said input file and said unique output file in a local map file on the file sharing server;
    wherein said synchronizing server is monitored with said file sharing server for a new input file which has been added, or for the removal of said input file that was in the file sharing server,
    wherein the new input file is downloaded from the synchronizing server to the file sharing server when the new it file has been added to the synchronizing server, and wherein, using said reference data, the input file and associated unique output file are deleted from the file sharing server when the input file has been removed from the synchronizing server.

18. The system as in claim 13, wherein the file processing application comprises a file generation application processing a source file to produce an output file having at least one of a specified naming convention, and a data identifying value.

19. The system as in claim 18, wherein said data identifying value comprises at least one of a data hash value, and a data size value.

20. The system as in claim 13, wherein the file template comprises at least one input template and a destination template accessible to the file sharing server, wherein the file processing application modifies the input file to the unique output file using the input template and the destination template.

21. The system as in claim 20, wherein said destination template comprises multiple unique destination templates that are randomly accessible to the file sharing server.

22. A system for generating one or more unique output files from an input file, said input file having at least a data identification portion, said system comprising:
   a file template associated with said input file, and containing at least information relating to said data identification portion;
   a computing hardware device accessing a file processing application to modify said data identification portion of the input file using said file template to generate the one or more unique output files;
   at least one synchronizing server receiving the input file and distributing the input file to a file sharing server; and
   reference data stored in the file sharing server, relating to the name of said input file and said unique output file in a local map file on the file sharing server,
   wherein said synchronizing server is monitored with said file sharing server for a new input file which has been added, or for the removal of said input file that was in the file sharing server,
   wherein the new input file is downloaded from the synchronizing server to the file sharing server when the new input file has been added to the synchronizing server, and
   wherein, using said reference data, the input file and associated unique output file are deleted from the file sharing server when the input file has been removed from the synchronizing server.

23. The system as in claim 22, wherein said file template comprises a first file template containing information relating to said data identification portion.

24. The system as in claim 23, wherein said first file template comprises an input template.

25. The system as in claim 24, wherein the input template is created manually.

26. The system as in claim 24, wherein the input template is created dynamically based on information made available by an information source.

27. The system as in claim 26, wherein the information source comprises a database.

28. The system as in claim 26, wherein the input template is embodied in a file.

29. The system as in claim 23, further comprising a second file template containing information related to the arrangement of said data identification portion.

30. The system as in claim 29, wherein said second file template comprises a destination template.

31. The system as in claim 30, wherein the destination template comprises multiple unique destination templates, said destination templates being accessed in a random fashion by said file processing application in order to generate the one or more unique output files.

32. The system as in claim 22, wherein the input file further having a data content portion comprising at least one of audio data, image data, video data, text data, software application data, and blank data.

33. The system as in claim 22, wherein said computing hardware device comprises a first server and a second server, said first server initially receiving said input file and distributing said input file to said second server, and said second server generating the one or more unique output files using the input file and the file template.

34. The system as in claim 33, wherein at least one of said unique output files is made available on a file sharing network using the second server.

35. The system as in claim 22, wherein the synchronizing server and the file sharing server operatively interact to provide updates of the input file and the unique output file on the file sharing server.

36. The system as in claim 35, wherein the file sharing server includes a maps file comprising information relating to the input file and the unique output file, which is used for providing the updates.

37. The system as in claim 36, wherein said updates comprise at least one of:
   at least one new input file added to said file sharing server; and
   at least one input file and associated unique output file removed on the file sharing server.

38. The system as in claim 22, wherein the file processing application comprises a file generation application processing a source file to produce an output file having at least one of a specified naming convention, and a data identifying value.

39. The system as in claim 38, wherein said data identifying value comprises at least one of a data hash value, and a data size value.

40. The system as in claim 22, wherein the file template comprises at least one input template and a destination template accessible to the file sharing server, wherein the file processing application modifies the input file to the unique output file using the input template and the destination template.

41. The system as in claim 40, wherein said destination template comprises multiple unique destination templates that are randomly accessible to the file sharing server.

* * * * *